US011132061B1

(12) United States Patent
Stanley et al.

(10) Patent No.: US 11,132,061 B1
(45) Date of Patent: Sep. 28, 2021

(54) FLUIDIC HAPTIC DEVICE OPERABLE BY USER MOVEMENT

(71) Applicant: Facebook Technologies, LLC, Menlo Park, CA (US)

(72) Inventors: Andrew Arthur Stanley, Seattle, WA (US); Nathan Scot Usevitch, Redmond, WA (US); Amirhossein Hajiagha Memar, Redmond, WA (US); Nicholas Colonnese, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 191 days.

(21) Appl. No.: 16/221,526

(22) Filed: Dec. 16, 2018

Related U.S. Application Data

(60) Provisional application No. 62/753,703, filed on Oct. 31, 2018.

(51) Int. Cl.
*G06F 3/01* (2006.01)
*G06T 19/00* (2011.01)

(52) U.S. Cl.
CPC .............. *G06F 3/016* (2013.01); *G06F 3/014* (2013.01); *G06F 3/017* (2013.01); *G06T 19/006* (2013.01)

(58) Field of Classification Search
CPC .......... G06F 3/016; G06F 3/014; G06F 3/041; F04B 43/10; F04B 43/113; F04B 45/073; F04B 45/0736
See application file for complete search history.

(56) References Cited

U.S. PATENT DOCUMENTS

| | | | | |
|---|---|---|---|---|
| 2003/0004657 A1* | 1/2003 | Allen | ...................... | G06F 3/016 |
| | | | | 702/45 |
| 2014/0285424 A1* | 9/2014 | Yairi | ....................... | G06F 3/016 |
| | | | | 345/156 |
| 2016/0296838 A1* | 10/2016 | Goetgeluk | ............ | A63F 13/285 |
| 2017/0300115 A1* | 10/2017 | Kerr | ......................... | G06F 3/011 |
| 2018/0107277 A1* | 4/2018 | Keller | ...................... | G06F 3/016 |
| 2020/0035071 A1* | 1/2020 | Anderson | ............... | F15B 15/10 |

OTHER PUBLICATIONS

Chinello et al., "Design and Evaluation of a Wearable Skin Stretch Device for Haptic Guidance", IEEE Robotics and Automation Letters, IEEE 2018, vol. 3, No. 1, 2018, 8 pages.

Gupta et al., "SqueezeBiock: Using Virtual Springs in Mobile Devices for Eyes-Free Interaction", Proceedings of the 23rd Annual ACM symposium on user interface software and technology, Oct. 3-6, 2010, 4 pages.

(Continued)

*Primary Examiner* — Sanjiv D. Patel
(74) *Attorney, Agent, or Firm* — FisherBroyles, LLP

(57) ABSTRACT

A fluidic haptic device includes a chamber, a compressible or incompressible fluid disposed within the chamber, and an actuatable element in hydraulic or pneumatic contact with the fluid. The actuatable element is adapted to be displaced by movement of a user of the device, which can apply pressure to the fluid. The haptic device may interact directly with one or more body parts of a user, including the user's skin, and may be operable without an external pressure source.

20 Claims, 12 Drawing Sheets

(56) References Cited

OTHER PUBLICATIONS

Choi et al., "Grabity: A Wearable Haptic Interface for Simulating Weight and Grasping in Virtual Reality", Proceedings of the 30th Annual ACM Symposium on User Interface Software and Technology, Oct. 22-25, 2017, 12 pages.

Bark et al., "A Wearable Skin Stretch Device for Haptic Feedback", Third Joint EuroHaptics conference and Symposium on Haptic Interfaces for Virtual Environment and Teleoperator Systems, Mar. 18-20, 2009, pp. 464-469.

Girard et al., "Hap Tip: Displaying Haptic Shear Forces at the Fingertips for Multi-Finger Interaction in Virtual Environments", Frontiers in ICT, vol. 3, No. 6, Apr. 2016, pp. 1-15.

Schorr et al., "Fingertip Tactile Devices for Virtual Object Manipulation and Exploration", Proceedings of the 2017 CHI Conference on Human Factors in Computing Systems, May 6-11, 2017, pp. 3115-3119.

Tsagarakis et al., "Slip Aestheasis: A Portable 2D Slip/Skin Stretch Display for the Fingertip", Proceedings of the First Join Eurohaptics Conference and Symposium on Haptic Interfaces for Virtual Environment and Teleoperator Systems, Mar. 2005, 6 pages.

Webster III et al., "A Novel Two-Dimensional Tactile Slip Display: Design, Kinematics and Perceptual Experiments", ACM Transactions on Applied Perception (TAP), vol. 2, No. 2, Apr. 2005, pp. 150-165.

Slocum, Alexander, "Topic 6: Power Transmission Elements II", Fundamentals of Design, 2008, 62 pages.

Purves et al., "Mechanoreceptors Specialized to Receive Tactile Information", Neuroscience—NCBI Bookshelf, URL: https://www.ncbi.nlm.nih.gov/books/NBK10895/, 2001, 2 pages.

Nakazawa et al., "Characteristics of human fingertips in the shearing direction", Biological Cybernetics, vol. 82, Apr. 2000, pp. 207-214.

Pezent et al., "Tasbi: Multisensory Squeeze and Vibrotactile Wrist Haptics for Augmented and Virtual Reality", Proceedings of the IEEE WHC 2019, 2019, 6 pages.

\* cited by examiner

US 11,132,061 B1

FLUIDIC HAPTIC DEVICE OPERABLE BY USER MOVEMENT

CROSS-REFERENCE TO RELATED APPLICATION

This application claims the benefit of priority under 35 U.S.C. § 119(e) of U.S. Provisional Application No. 62/753,703, filed Oct. 31, 2018, the contents of which are incorporated herein by reference in their entirety.

BACKGROUND

Virtual reality (VR) and augmented reality (AR) systems and devices may enable users to experience events, such as interactions with people in a computer-generated simulation of a three-dimensional world or viewing data superimposed on a real-world view. Moreover, VR/AR systems may also be used for purposes other than recreation. For example, governments may use VR/AR systems for military training, doctors may use such systems to simulate surgery, and engineers may use such systems as design visualization aids.

In AR systems, for instance, computer graphics can be merged with actual imagery in real time for display to a user. Furthermore, the scope of AR has expanded recently to include non-visual augmentation, such as haptic feedback. In this vein, various systems have been proposed for integrating haptic information into VR/AR, but such systems are typically complicated or limited to simple vibrational interaction with the user. Notwithstanding recent developments, it would be advantageous to provide variable VR/AR systems that provide, for example, interactive haptic stimulation in a wearable form factor.

SUMMARY

As will be described in greater detail below, the instant disclosure relates generally to haptic feedback devices, and more specifically to user-driven and user-wearable haptic systems, as well as associated materials, methods, and mechanics of operation. Example haptic devices may interact directly with one or more body parts of a user, including the user's skin, and may be operable without an external pressure source.

According to some embodiments, a fluidic haptic device may include a chamber, a compressible or incompressible fluid disposed within the chamber, and an actuatable element in hydraulic or pneumatic contact with the fluid. An example fluid is air. The actuatable element may be adapted to be actuated by movement of a user of the device. The device may further include a 2-way valve that is adapted to restrict fluid flow within the chamber.

The chamber may include a closed circuit and may further include a primary fluidic capacitor and a secondary fluidic capacitor in fluid communication with the primary fluidic capacitor. By way of example, the primary fluidic capacitor may have a volume less than a volume of the secondary fluidic capacitor and may include a flexible material such as a polymer-coated fabric while the secondary fluidic capacitor may include a rigid material. In conjunction with various embodiments, the actuatable element may be coupled to the movements of a user and may include, for example, a roller, diaphragm, membrane, or piston. The device may further include a valve in fluid communication with both the primary fluidic capacitor and the secondary fluidic capacitor.

A further example haptic device includes a chamber, a fluid disposed within the chamber, an actuatable element in hydraulic or pneumatic contact with the fluid, and a 2-way valve adapted to restrict fluid flow within the chamber, where the actuatable element is adapted to be actuated by movement of a user of the device. The foregoing devices may be incorporated into a virtual reality or augmented reality system.

According to further embodiments, disclosed is a method of operating a haptic device that includes a chamber, a fluid disposed within the chamber, and an actuatable element in hydraulic or pneumatic contact with the fluid. The example method may include coupling motion of the actuatable element to motion of a user and applying a pressure to the fluid by displacing the actuatable element using movement of the user. The device may further include a valve adapted to restrict the flow of fluid within the chamber. During operation the valve may be actuated to restrict the flow of fluid between primary and secondary fluidic capacitors. In example embodiments, the primary and secondary fluidic capacitors may be configured such that the volume of the secondary fluidic capacitor is greater than the volume of the primary fluidic capacitor.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
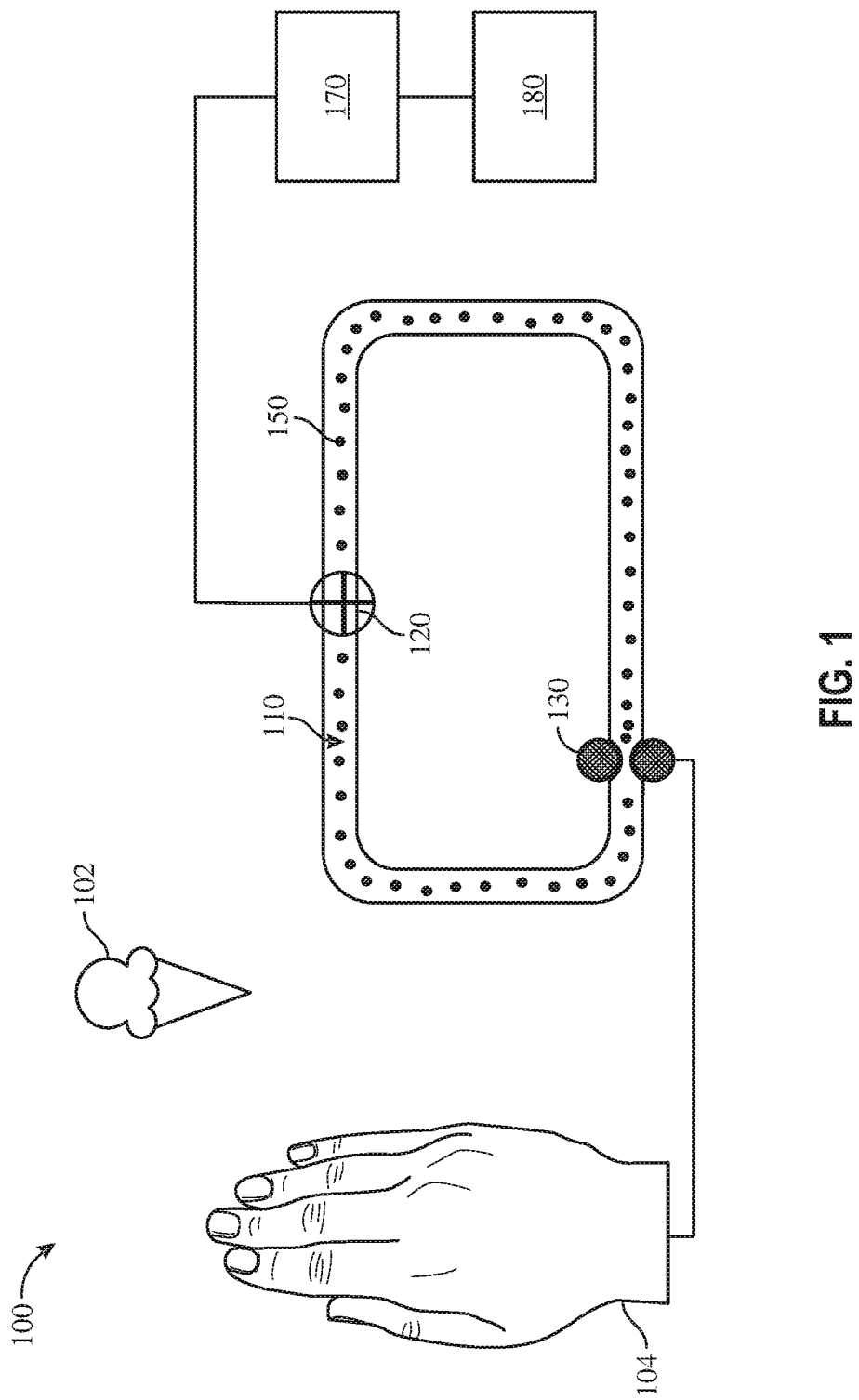
FIG. 1 is a schematic illustration of an example fluidic haptic system according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to haptic systems and devices. As will be explained in greater detail below, embodiments of the instant disclosure relate to fluidic haptic devices that may be actuated at least in part by a user's motion. Some embodiments relate to haptic feedback devices configured to represent virtual objects in contact with a person in an AR space. Example haptic feedback devices can be implemented as an interactive device such as a keyboard or a touchpad, or as a wearable device, such as a glove or other wearable form factor configured to convey haptic information to the user.

According to some embodiments, a closed-volume haptic device may operate pneumatically or hydraulically via interactions with a user, i.e., without an external source of pressure. A valve such as an electromagnetic valve may be used to control the build-up or release of pressure of a compressible or incompressible fluid and thus dynamically change the impedance experienced by the user whose movements drive the fluid flow and the attendant pressure change.

Various architectures are disclosed, including closed continuous circuit and passive reservoir geometries. For example, a grounded kinesthetic device may include a continuous, flexible fluidic loop and a crimping element configured to pinch the flexible loop and translate along the length of the loop while crimped, thereby pushing fluid around the loop. The loop may further include a valve adapted to arrest fluid flow therethrough. When the valve is open, the crimping element may translate with nominal resistance as fluid is pushed around the loop. When the valve is closed, however, the build-up of pressure within the loop provides resistance to translation. In an AR space, the resistance may be interpreted by the user of the device as an interaction with a virtual element such as a wall. According to some embodiments, multiple loops in series may allow control of multiple degrees of freedom of user impedance, and multiple valves within a loop or multiple loops in parallel may allow more precise discretization of user impedance levels.

According to further embodiments, a piston coupled to a user's movements may be configured to compress fluid within a primary fluidic capacitor (chamber). The primary fluidic capacitor may be in fluid communication by way of a valve with a secondary, passive fluidic capacitor (reservoir). The valve may be controlled, e.g., by the pressure within the primary fluidic capacitor, to affect the resistance to piston motion felt by the user. As used herein, a "fluidic capacitor" may include a chamber that stores fluid as it is pressurized.

Figure 10:
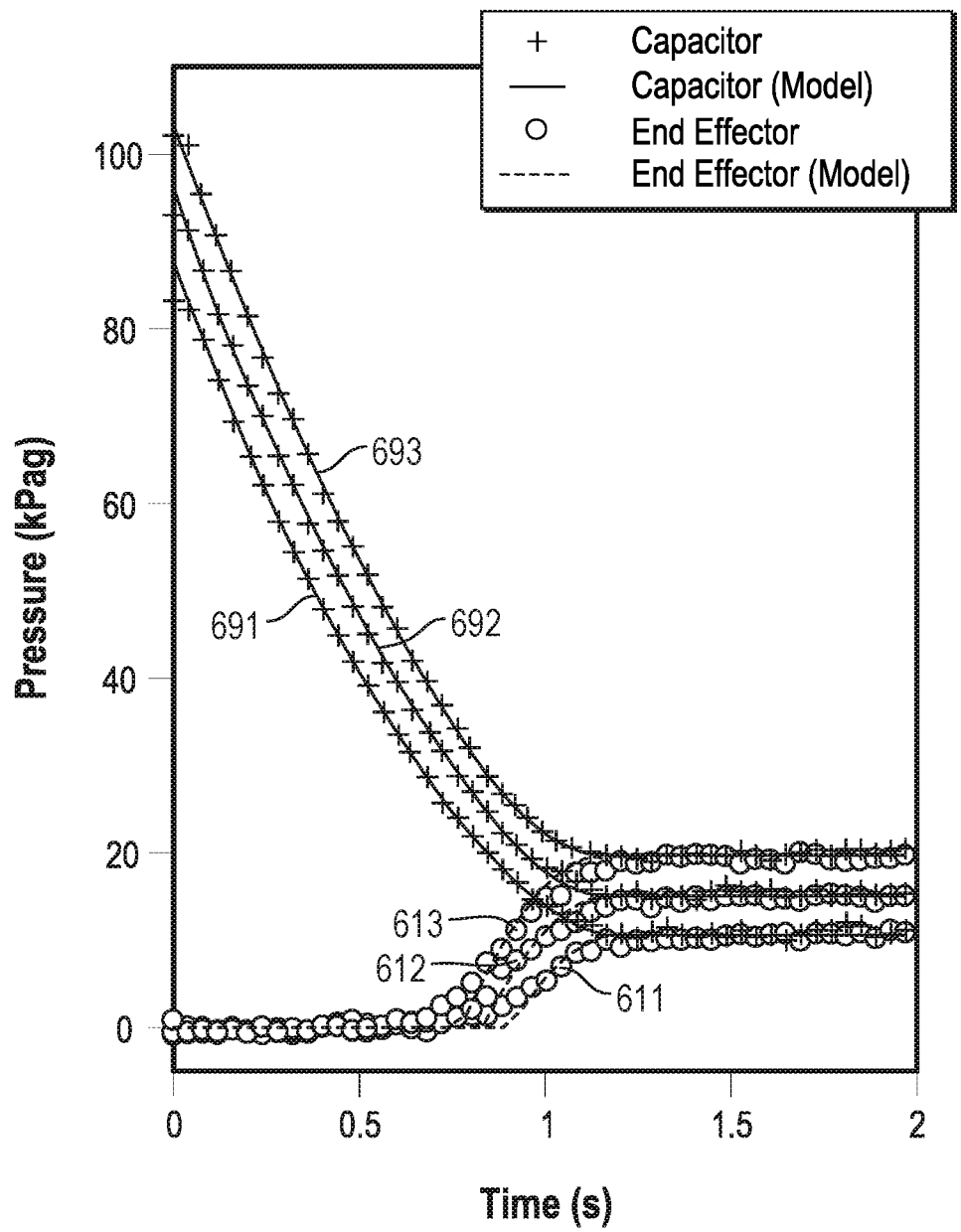
FIG. 10 is a plot showing the change in pressure within both an effector and a capacitor according to some embodiments.
Figure 11:
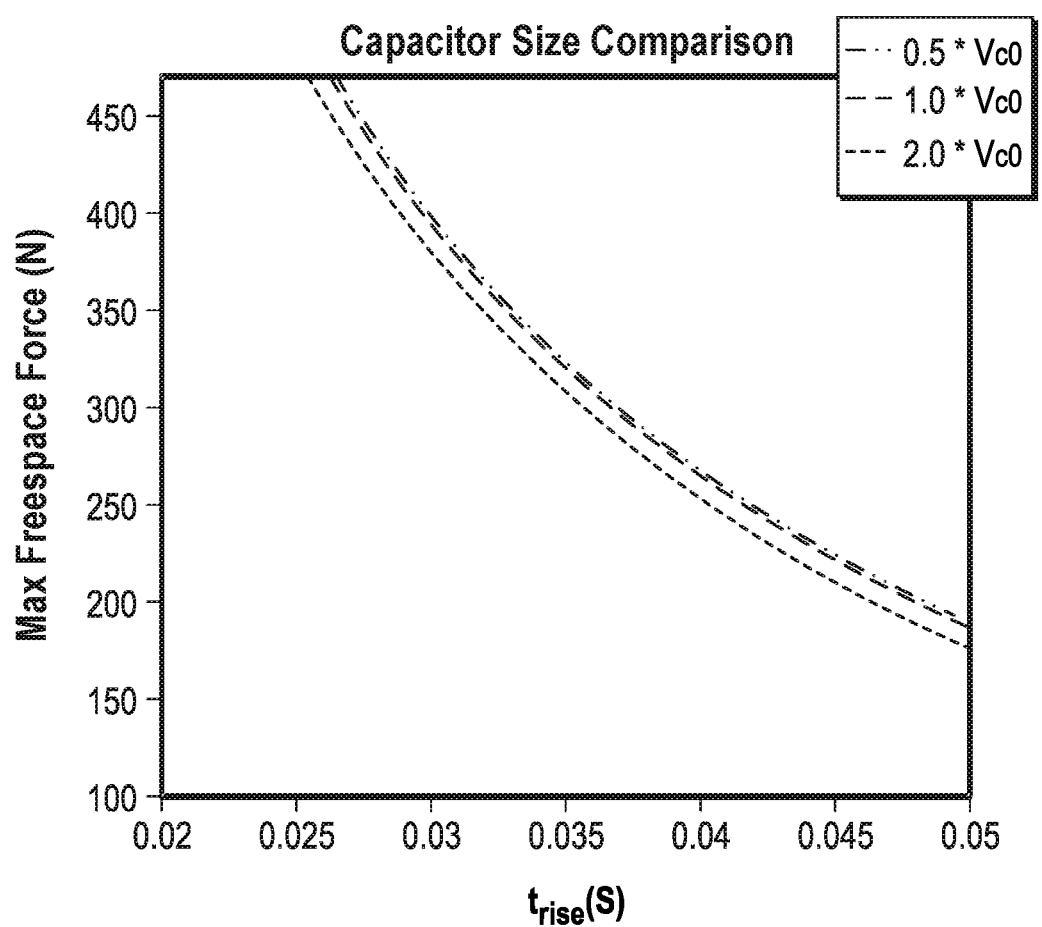
FIG. 11 is a Pareto chart illustrating a comparison of, for example, haptic systems having different capacitor sizes according to various embodiments.
Figure 12:
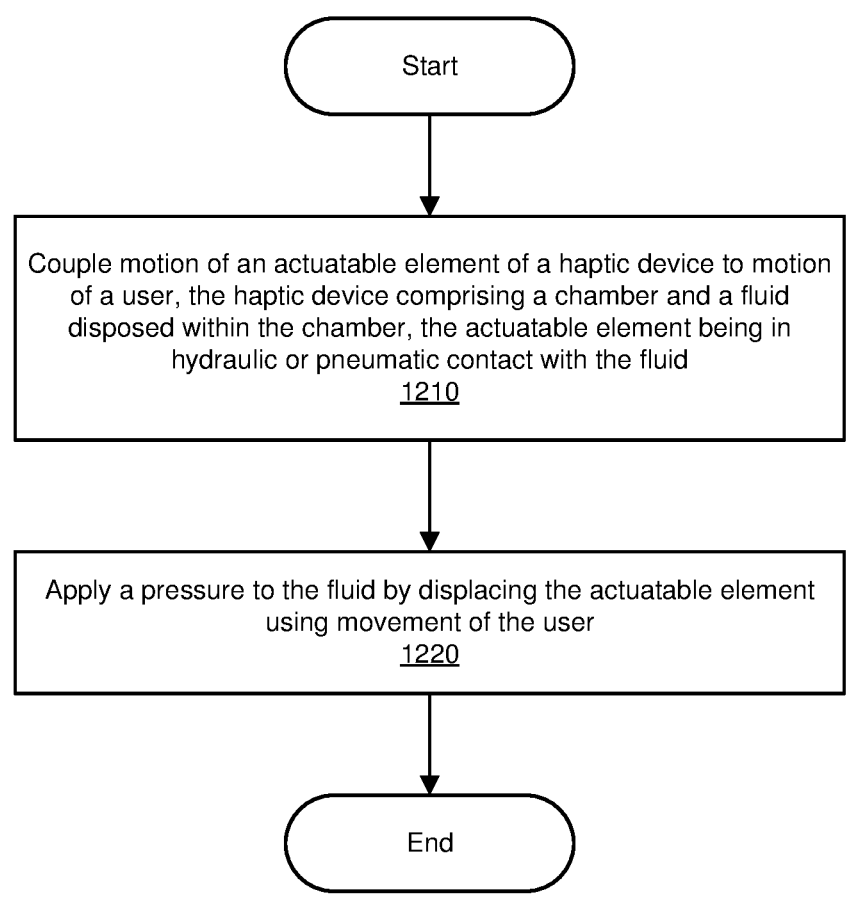
FIG. 12 is a flow diagram of an exemplary method for operating a fluidic haptic device according to some embodiments.

Further to the foregoing, the following will provide, with reference to FIGS. 1-11, a detailed description of methods, systems, and apparatuses for forming fluidic haptic devices. The discussion associated with FIG. 1 includes a description of an example fluidic haptic system according to some embodiments. The discussion associated with FIGS. 2-4B includes a description of various fluidic haptic systems, including associated materials, methods, and mechanics of operation according to some embodiments. The discussion associated with FIG. 5 includes a description of the pressure response to actuation within an example fluidic haptic device. The discussion associated with FIGS. 6-11 relates to the structure, operation and performance of an experimental haptic device. Additionally, the discussion corresponding to FIG. 12 provides an example of a method for operating a fluidic haptic device in accordance with various embodiments.

Example systems may include a fluidic circuit, a valve disposed within the fluidic circuit, an actuatable element coupled to the user's motion and configured to pressurize fluid within the circuit, a control module, and a power source. By way of example, FIG. 1 is a schematic diagram of a haptic system 100 that includes a fluidic haptic device, arranged in accordance with at least some embodiments described herein. Generally, the system 100 may be configured to represent a virtual object 102 in contact with a body part 104 of a person in an AR space. For instance, the system 100 may be configured to evoke, in the person, an interaction with the virtual object.

In the illustrated embodiment of FIG. 1, the system 100 includes a fluidic circuit 110 having a valve 120 adapted to arrest the flow of a fluid 150 contained within the fluidic circuit 110. The system 100 further includes an actuatable element 130 coupled to the motion of a user 104 and configured to apply a force to the fluid 150. In some embodiments, motion of the actuatable element 130 induces motion of the fluid 150. The actuatable element 130 may be coupled to the user's motion by wearing or otherwise engaging with components of the system. In some embodiments, a control module 170 and a power source 180 may be used to control elements of the system 100, such as valve 120.

The valve 120 may include an electromechanical valve operable to allow fluid flow therethrough in an open position and arrest fluid flow in a closed position. In some embodiments, valve 120 may completely arrest fluid flow therethrough (i.e., completely closed). In some embodiments, valve may be partially open.

In accordance with some embodiments, the actuatable element 130 may include, for example, a roller, diaphragm, membrane, piston, or other element that is hydraulically or pneumatically coupled to the fluidic circuit 110 so as to pressurize fluid 150 within the circuit in response to motion by the user.

The control module 170 may be electrically coupled to the power source 180 so as to control the power source 180. In some embodiments, the power source 180 may include a DC battery or an AC power supply and may be electrically coupled, for example, to the valve 120 to control a position of the valve and accordingly allow or prevent the flow of fluid 150 within the fluidic circuit 110.

According to some embodiments, the control module 170 may be configured to provide data to the power source 180. The data may represent various states of contact between a person and the virtual object 102. For instance, data signals may represent a different state of contact between the body part 104, such as the hand of the user, and the virtual object 102 within an AR space. Although not shown, the control module 170 may also include or otherwise implement a processor to execute computer-executable instructions stored in a memory or other data storage device.

According to certain embodiments, an example haptic system and its operation are illustrated schematically in FIGS. 2A-2D. System 200 includes a chamber defining a closed, continuous fluidic circuit 210, which may be formed from compliant or semi-rigid tubing 215, for example, an electromechanical valve 220 integral with the circuit 210, and an actuatable element 230 such as a pair of rollers configured to clamp the tubing 215 and translate along at least one segment of the fluidic circuit 210, e.g., back and forth, as indicated by arrow A in FIG. 2A. Actuatable element 230 may include any other suitable element for clamping tubing 215, such as, for example, a single roller that clamps tubing 215 against a solid surface.

The system 200 further includes a fluid 250 contained within the tubing 215 of the closed fluidic circuit 210. Fluid 250 may include a compressible fluid, such as a gas, or a substantially incompressible fluid such as a liquid. Example fluids include air, nitrogen, water, or an oil. In certain embodiments, fluid 250 has a uniform viscosity.

Figure 2B:
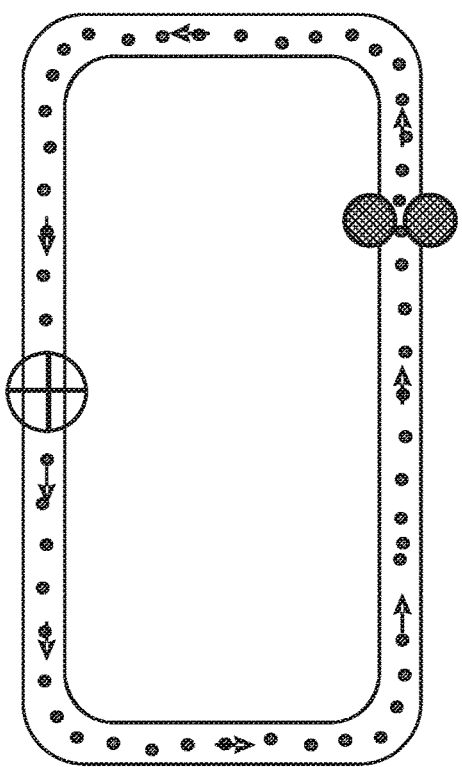
FIG. 2B is a schematic showing the closed-loop fluidic haptic system of FIG. 2A following actuation according to certain embodiments.
Figure 2D:
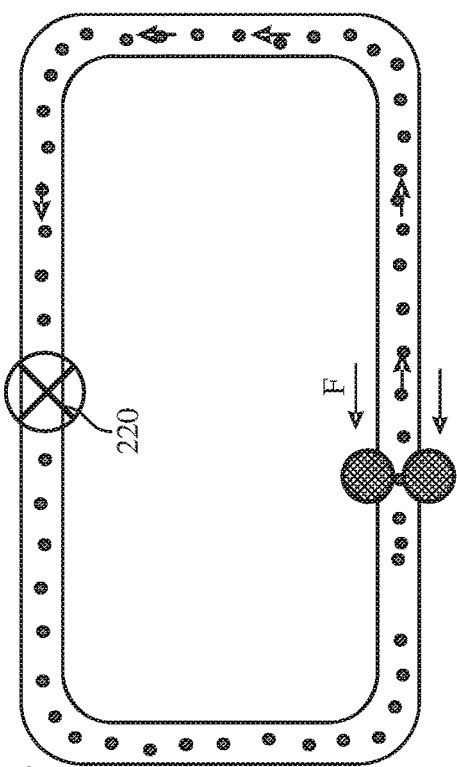
FIG. 2D is a schematic showing the closed-loop fluidic haptic system of FIG. 2C following actuation according to certain embodiments.
Figure 2A:
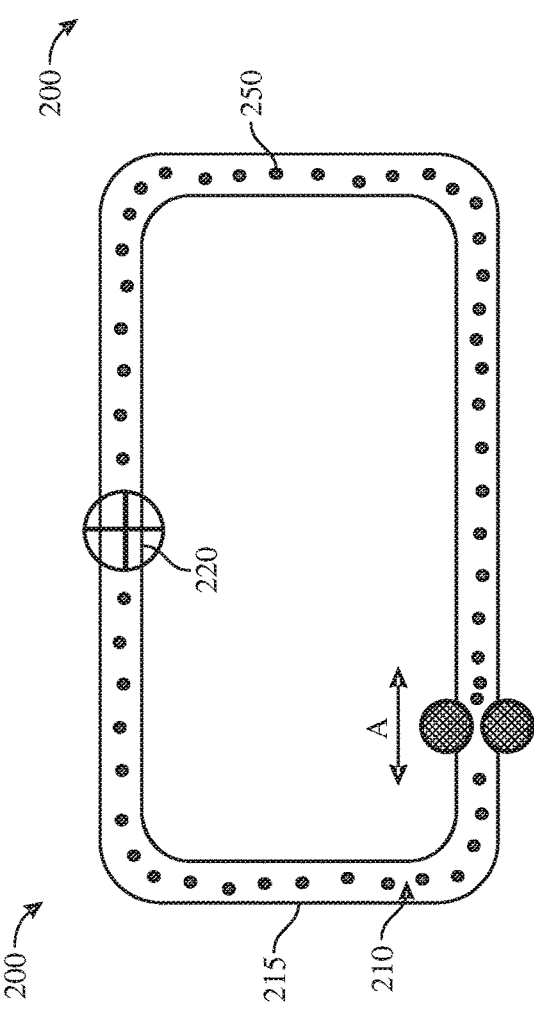
FIG. 2A is a schematic diagram showing a closed-loop fluidic haptic system having an open valve prior to actuation according to some embodiments.

During operation, according to some embodiments, while valve 220 is open, actuatable element 230, which may be coupled to the motion of a user (not shown), may clamp tubing 215 and translate (i.e., from left to right as shown in FIGS. 2A and 2B) in a manner so as to push the fluid 250 around the circuit 210. With valve 220 open, the nominal resistance experienced by the actuatable element 230 and hence by the user is principally that of the fluid flowing through the tubing 215. With valve 220 open, the force (and hence the pressure) exerted on the actuatable element 230 is substantially invariant as a function of the position of the actuatable element.

Figure 2C:
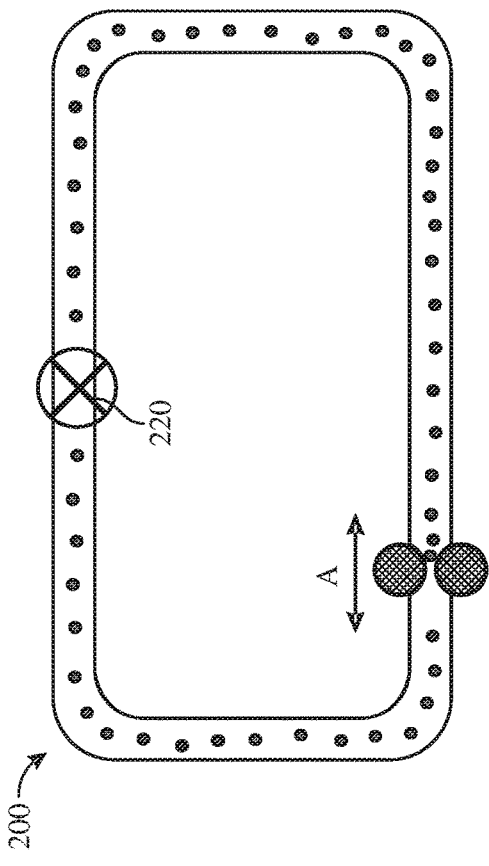
FIG. 2C is a schematic diagram showing a closed-loop fluidic haptic system having a closed valve prior to actuation according to some embodiments.

According to further embodiments, as shown schematically in FIG. 2C and FIG. 2D, with valve 220 closed, the fluid flow within the tubing 215 is interrupted such that motion of the actuatable element 230 may compress the fluid 250 upstream of valve 220. With fluid flow stopped by valve 220, the associated accumulation of pressure within the circuit 210 exerts a force (F) on the actuatable element 230 opposite to the force originating the motion, which resists further motion of the actuatable element 230. That is, the resistance to motion of the actuatable element 230 perceived by a user when valve 230 is closed may be greater than the perceived resistance when the valve 220 is open.

In the illustrated embodiment, the accumulated pressure and the attendant force (F) exerted on the actuatable element 230 by the fluid 250 may be achieved without an external pressure source, i.e., using only the user's motion to drive the fluid. Moreover, system 200 is operable to alter the resistance felt by the user, e.g., between free-flowing motion and a blocking force, which may be interpreted in an AR system as an interaction with an object, such as a wall, for example. In some embodiments, two or more such systems 200 may be arranged to provide interactions in two or more dimensions.

Figure 3:
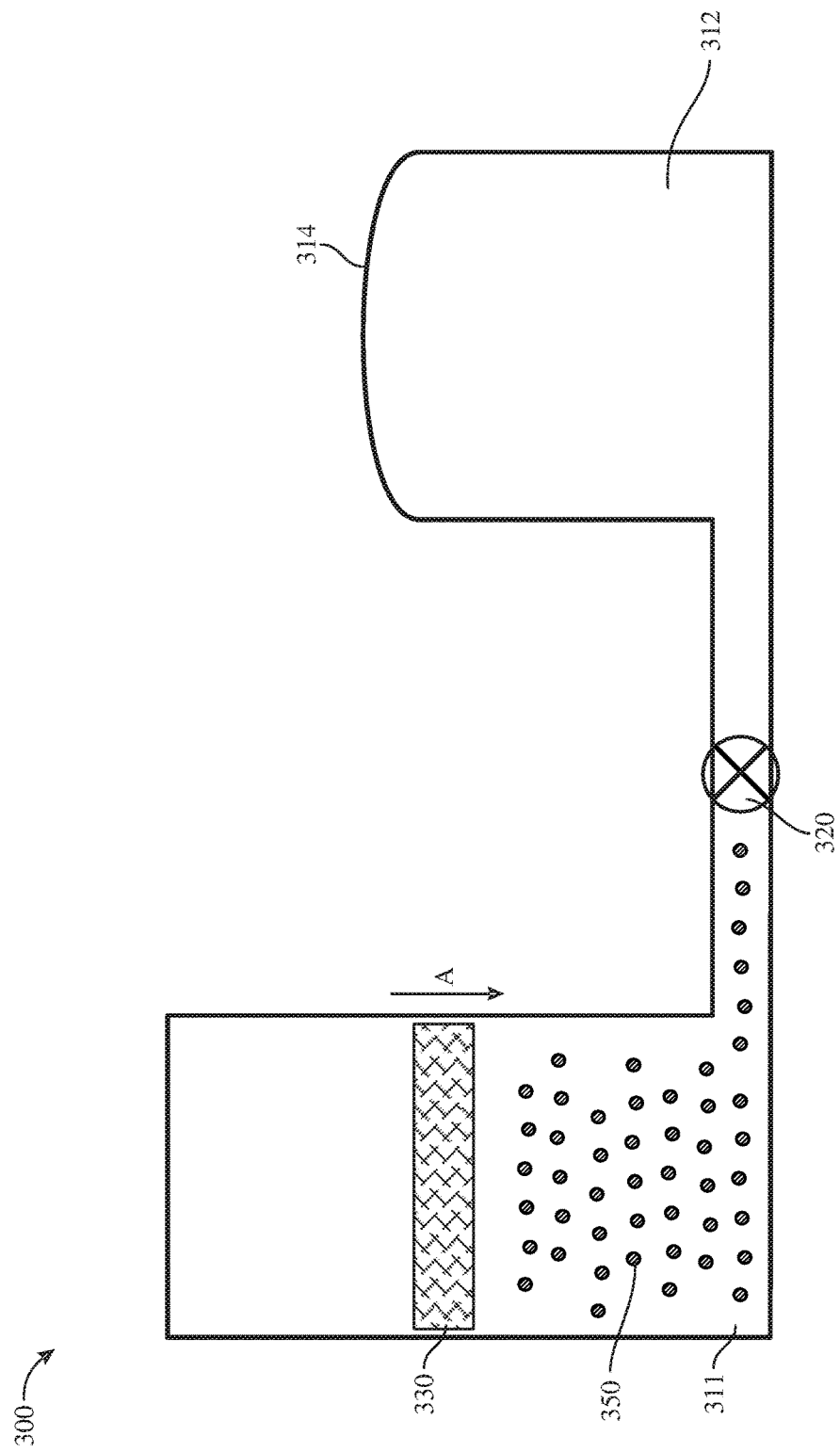
FIG. 3 shows a closed-volume fluidic haptic system according to some embodiments.

A further example fluidic haptic system is described with reference to FIG. 3. In the illustrated embodiment, system 300 includes two or more chambers that are in fluid communication with each other. The chambers may include a primary fluidic capacitor 311 (i.e., primary chamber) and a secondary fluidic capacitor 312 (i.e., reservoir). The primary and secondary fluidic capacitors 311, 312 may be connected by a valve 320.

In accordance with some embodiments, the chamber volumes may be equal or unequal. For instance, the volume (V1) of the primary fluidic capacitor 311 may be less than, equal to, or greater than the volume (V2) of the secondary fluidic capacitor 312. According to some embodiments, the volume of the primary fluidic capacitor 311 may range from approximately 0.1 times (i.e., V1=0.1V2) to approximately 10 times (e.g., V1=10V2) the volume of the secondary fluidic capacitor 312, e.g., 0.1, 0.2, 0.5, 1, 2, 5 or 10 times, including ranges between any of the foregoing values.

The system 300 further includes an actuatable element 330, which may be coupled to the motion of a user (not shown) and configured to apply a force to fluid 350 disposed within the primary fluidic capacitor 311. By way of example, actuatable element 330 may include a piston.

In certain embodiments, for use in conjunction with a compressible fluid such as a gas, the primary and secondary fluidic capacitors 311, 312 may include a rigid structure, while the primary and secondary fluidic capacitors 311, 312 may include a compliant structure for use in conjunction with an incompressible fluid such as a liquid.

The resistance to motion of actuatable element 300 (i.e., in the direction of arrow A) may be controlled using valve 320, which may be used to facilitate the build-up or release of fluid pressure within primary fluidic capacitor 311, e.g., by blocking or permitting, respectively, the flow of fluid 350 from primary fluidic capacitor 311 to secondary fluidic capacitor 312. Thus, the operation of valve 320 in conjunction with fluid flow within the system 300 may dynamically modify the impedance experienced by the user whose movements drive actuatable element 330.

In some embodiments, the valve 320 may be controlled by the pressure within the primary fluidic capacitor 311, to affect the resistance to piston motion felt by the user. For instance, a user may experience less resistance from actuatable element 330 when valve 320 is at least partially open than when valve 320 is closed.

In some embodiments, secondary fluidic capacitor 312 may include a flexible membrane 314, the expansion or contraction of which may mediate the build-up of pressure within secondary fluidic capacitor 312 and affect the resistance to piston motion felt by the user in embodiments where valve 320 is open. For instance, when valve 320 is open, a user engaging actuatable element 330 may pump fluid 350 into secondary fluidic capacitor 312, such as a flexible secondary fluidic capacitor 312, which may expand flexible membrane 314. When the user disengages the actuatable element 330, contraction of the flexible membrane 314 may force fluid from the secondary fluidic capacitor 312 back into the primary fluidic capacitor 311. When valve 320 is closed, however, the user may sense a greater resistance, i.e., stiffness, when engaging the actuatable element 330.

Figure 4B:
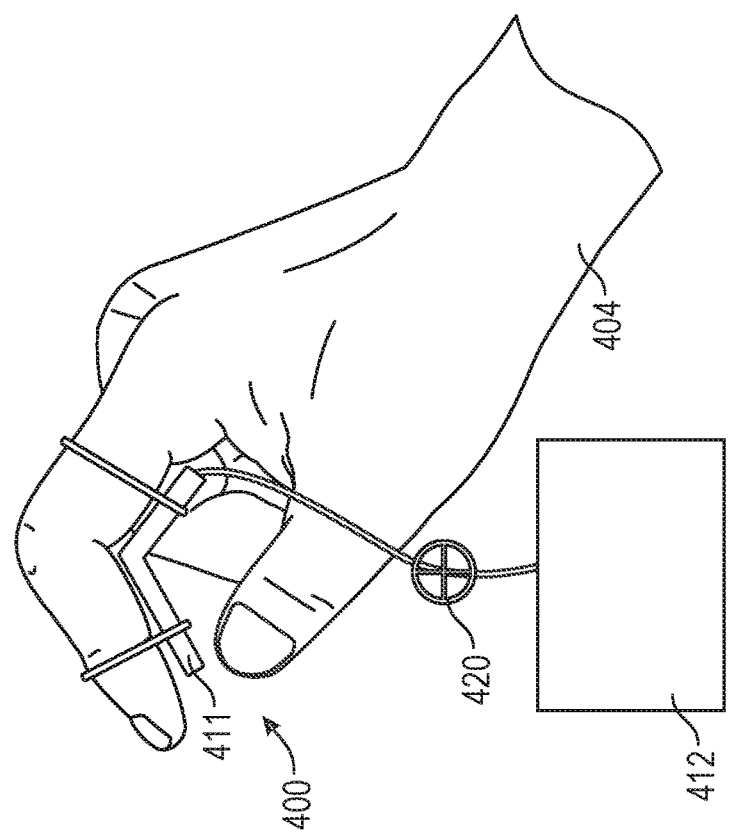
FIG. 4B shows the closed-volume fluidic haptic system of FIG. 4A following actuation according to some embodiments.
Figure 4A:
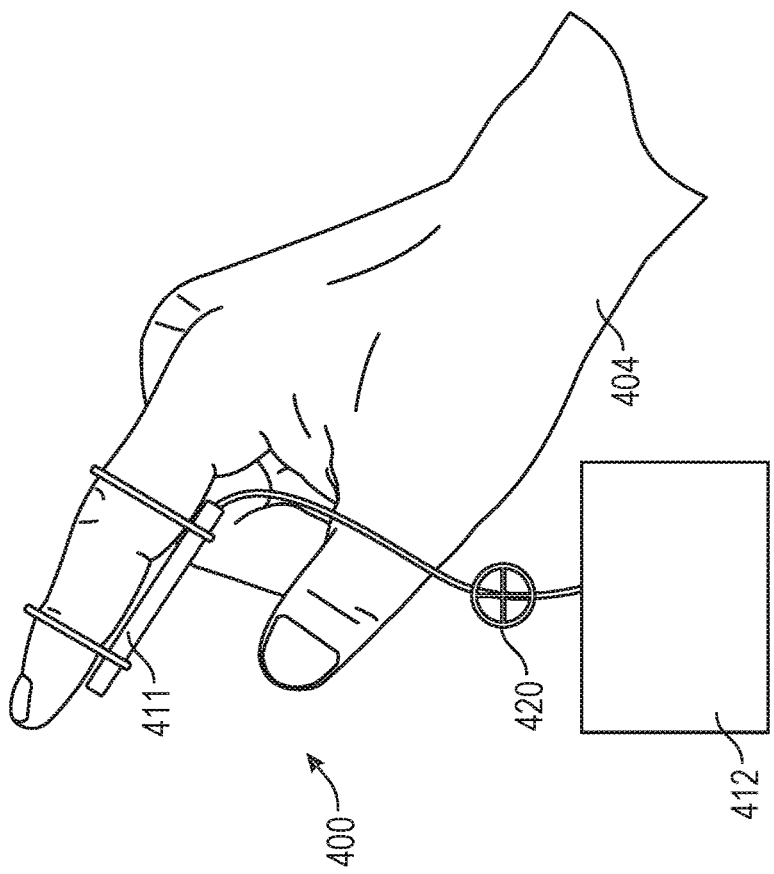
FIG. 4A shows a closed-volume fluidic haptic system prior to actuation according to certain embodiments.

In certain embodiments, a fluidic haptic system may be incorporated into a wearable form factor. With reference to FIGS. 4A and 4B, for example, a closed fluidic haptic system 400 includes a primary fluidic capacitor 411 in fluid communication via valve 420 with a secondary fluidic capacitor 412. The primary fluidic capacitor 411 may be affixed to a body part 404, such as a finger.

Figure 5:
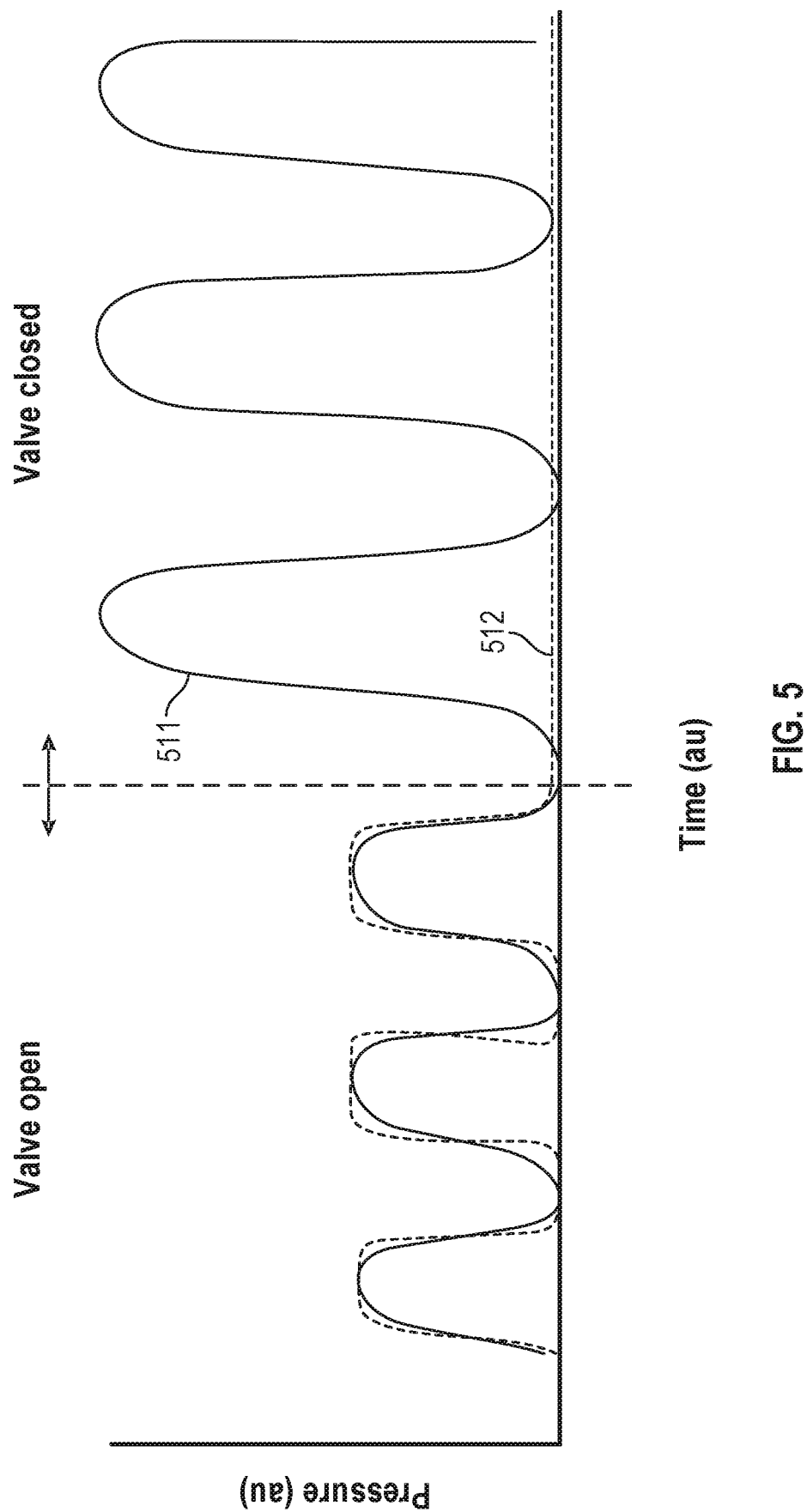
FIG. 5 is a plot of pressure versus time showing the pressure response to actuation within primary and secondary fluidic capacitors for both open and closed valve conditions for the haptic system of FIGS. 4A and 4B according to some embodiments.

During operation, with valve 420 open, flexing of the finger induces a substantially simultaneous pressure increase and decrease as a function of time in both the primary fluidic capacitor 411, i.e., proximate to the user, and the secondary fluidic capacitor 412, as shown graphically in FIG. 5.

By closing valve 420, according to some embodiments, an increased stiffness may be perceived pursuant to a decrease in the overall volume of the system accessible to the fluid in the primary fluidic capacitor 411. As seen in FIG. 5, with valve 420 closed, oscillatory motion of the finger causes an increase and decrease of the pressure 511 within the primary fluidic capacitor 411, i.e., at a greater maximum amplitude compared to the valve open condition, while within the isolated secondary fluidic capacitor 412, the pressure 512 is substantially unchanged.

In some embodiments, a single fluidic haptic system 400 having a single primary fluidic capacitor 411 may be used in conjunction with a single finger or a plurality of fingers. According to further embodiments, multiple primary fluidic capacitors 411 may be affixed to respective ones of a plurality of fingers.

In various cases of haptic interaction, one-sided coupling is desired where, for example, an object held within a user's hand blocks the fingers from moving inward but allows the fingers to move outward with little or no resistance. In such a case, the user's motion may drive fluid from the primary fluidic capacitor into the secondary fluidic capacitor. When the user disengages, pressure in the primary fluidic capacitor may be restored as the fluid flows passively from the secondary fluidic capacitor back into the primary fluidic capacitor.

According to a further embodiment, a fluidic haptic device may be incorporated into a virtual tactile element, such as a virtual keyboard, push button, or switch. In some embodiments, a flexible primary fluidic capacitor (such as primary fluidic capacitor 411 in FIGS. 4A and 4B) may be coupled to a body part of a user, such as a finger, and arranged to be in fluid communication with a secondary fluidic capacitor (such as secondary fluidic capacitor 412) by way of a valve (e.g., valve 420). A fluid such as air may be disposed within the primary fluidic capacitor. A control module receiving data related to a pressure within the primary fluidic capacitor and/or within the secondary fluidic capacitor may be used to control the valve.

In an example embodiment, during operation, the valve may be initially closed such that the user may encounter resistance when attempting to depress the flexible primary fluidic capacitor. Sensing an increase in pressure within the primary fluidic capacitor, the control module may open the valve when a critical pressure within the primary fluidic capacitor is reached, allowing the pressurized fluid to flow from the primary fluidic capacitor to the secondary fluidic capacitor. The change (decrease) in pressure within the primary fluidic capacitor and the attendant decrease in resistance to the force applied by the user may manifest as movement of the primary fluidic capacitor, which may be interpreted by the user as the depression, e.g., a click-through sensation, of a virtual keyboard key or the toggling of a virtual switch, for example.

In accordance with certain embodiments, disclosed herein is a model describing the performance, including the dynamic impedance, of a haptic device. The model assumes a closed pneumatic system that includes an end effector or actuator (primary fluidic capacitor) coupled to a user's motion, a fluid storage device (secondary fluidic capacitor), and transmission element (tubing) between the primary and secondary fluidic capacitors that contains a controllable electromechanical valve.

The end effector may be any known or future-discovered pneumatic actuator. For evaluation of the model, the end effector is composed of a flexible, inextensible material, e.g., ripstop nylon fabric coated with thermoplastic polyurethane (TPU). Air is used as the working fluid, and a rigid container is used for the fluid storage device. Although an incompressible working fluid would allow for a greater maximum stiffness, the resistance to flow of an incompressible fluid is greater than that of a compressible fluid, which leads to slower dynamics, larger forces and higher frequencies. In addition, an incompressible working fluid requires that the fluid storage device also be flexible, which increases the complexity of the system.

For the model, the pressure, mass, and volume of the end effector are denoted $P_u$, $m_u$, and $V_u$, respectively, while the pressure, mass and volume of the fluid storage device (capacitor) are denoted $P_c$, $m_c$, and $V_c$. Assuming that the temperature of the fluid is constant, and the system is closed, the ideal gas law and conservation of mass may be represented as $P_u V_u + P_c V_c = P_0 (V_{u0} + V_{c0})$, where $P_0$ is the initial pressure of the entire system at equilibrium, and $V_{u0}$ and $V_{c0}$ are the initial volumes of the end effector and capacitor.

In various embodiments, the user's motion serves as the pressure source, which may cause fluid to flow through the circuit and be stored in the capacitor. When the user is moving slowly, $P_u = P_c$, the impedance felt by the user is substantially independent of the dynamics of the circuit. When moving at higher frequencies, however, the dynamics of the fluidic circuit influence the impedance felt by the user.

In modeling the quasistatic impedance of the system, including the relationships between compression of the end effector and the resultant force and pressure within the circuit, it is noted that the shape of a flexible, un-stretchable actuator is approximately constant provided that the pressure within the actuator is higher than atmospheric pressure ($P_u > P_{atm}$). As such, the end effector volume ($V_u$) can be expressed as a function of the generalized displacement, x, of the volume, i.e., $V_u = f(x)$. It is also assumed that $V_c$ is constant, meaning that the capacitor is a rigid container.

Using the principle of virtual work to relate the force (F) applied to the user and the resultant displacement to the work done by the pressure, $(P-P_0)dV = -Fdx$. As the system is closed, by Boyle's law we can write $$P(x) = \frac{P0V0}{V(x)} \text{ and } F = -\left(\frac{P0V0}{V} - P_{atm}\right)\frac{dV}{dx}.$$

By taking the derivative of the force with respect to position, the stiffness (K) may be expressed as $$K = \frac{dF}{dx} = P_0 V_0 \left(\frac{\left(\frac{dV}{dx}\right)^2}{V^2} + \frac{d^2V}{dx^2}\right).$$

To evaluate the change in stiffness that may be achieved by closing the valve between the end effector and the capacitor, noting that with the valve open, and assuming a quasi-static condition, $V=V_0=V_c+V_u$, and with the valve closed, $V=V_0=V_u$, is can be shown that $$\frac{K \text{ closed}}{K \text{ open}} = \frac{Vu + Vc}{Vu}.$$

Thus, for a rigid capacitor, increasing the stiffness by a factor of n requires the ratio of the closed and open volumes to be n. For example, to achieve a 10× stiffness change, the ratio of closed volume to open volume must be 10. While large, instantaneous changes in stiffness require large ratios of volumes, it is also observed that force and stiffness increase rapidly with displacement. This indicates that, in accordance with some embodiments, while only modest instantaneous changes in stiffness can be obtained for modest volume ratios, the device can still exert large forces.

In certain embodiments, when a user disengages the actuator, the device may be configured to quickly and passively refill the end effector with fluid, e.g., air. An orifice plate resistance model, which consolidates all the contributions to the resistance within the system, may be represented as $\dot{m}=\sqrt{R\backslash Pu(Pc-Pu)}$, where $\dot{m}$ is the mass flow rate of the fluid, for example in kg/sec.

The parameter R\ is an engineering parameter that can be used to fit experimental data to the model. In the instant model, the state of the differential equation is the mass of air in the end effector, $m_u$. By conservation of mass, $$m_c = \frac{P_0(Vu + Vc)}{RT} - m_u.$$

From the ideal gas law, $$P_c = \frac{m_c RT}{V_c}.$$

For the fabric actuator, in certain embodiments, the relationship of mass to pressure is bimodal. Initially, air that enters the actuator causes the actuator to expand at pressure $P_{atm}$, and once the actuator has expanded to its final volume it acts as a rigid container. Mathematically, the mass-pressure relationship can be expressed as:

$$P_u = \begin{cases} Patm & mu < \frac{Patm\, Vu, \max}{RT} \\ \frac{m_u RT}{Vu} & mu \geq \frac{Patm\, Vu, \max}{RT} \end{cases}$$

Figure 6:
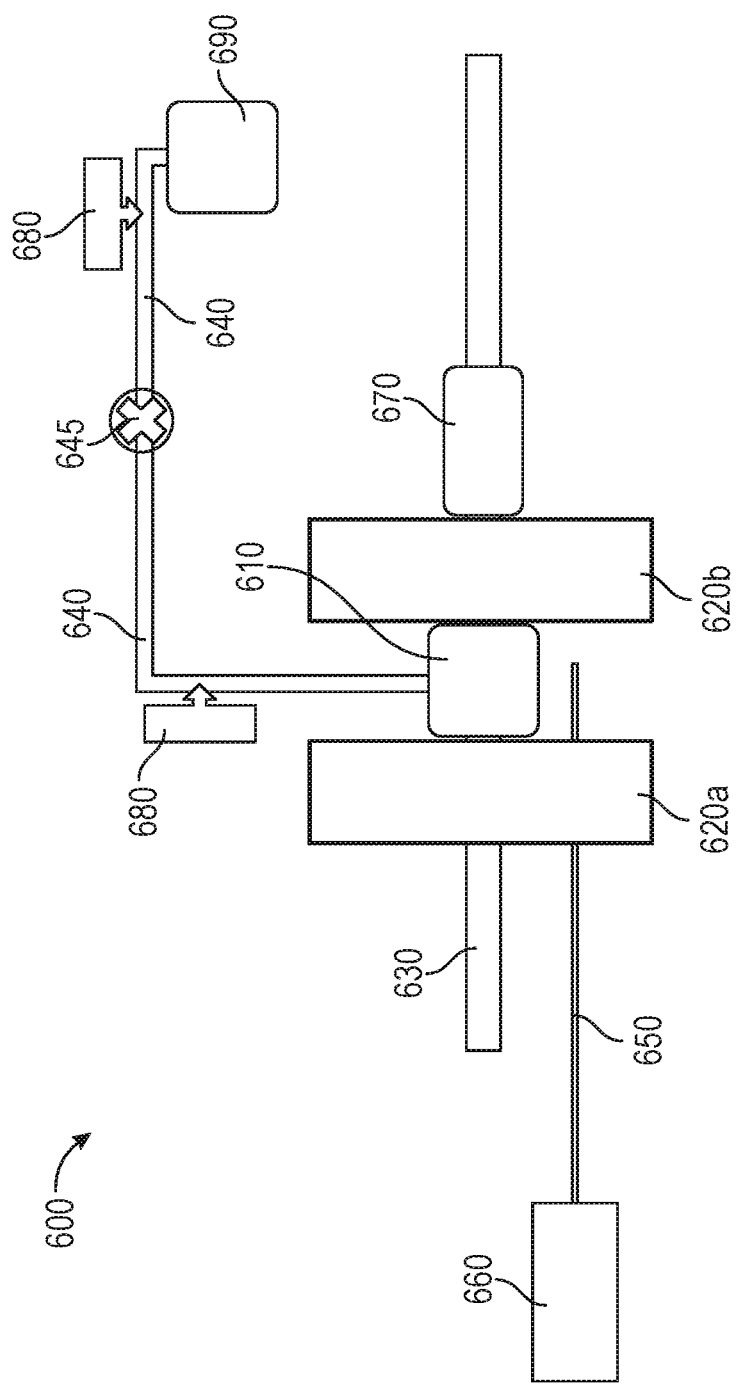
FIG. 6 is a diagram of an experimental haptic system according to certain embodiments.

Device performance as well as the validity of the models for impedance and response time may be evaluated using the experimental setup shown in FIG. 6. In the experimental device 600, a fabric actuator 610 is placed between parallel primary and secondary acrylic plates 620a, 620b mounted on a linear bearing 630 that is configured to provide a compressive force. A closed fluidic circuit may be formed using flexible, incompressible tubing 640. The position of the primary plate 620a may be controlled by a lead screw 650 driven by a servo motor 660. The motor 660 may be operated with closed loop position control.

The experimental device 600 may be operated using a desktop computer, and/or any other suitable computing device, with controls and sensors managed through a NI Daq RIO (not shown). The forces applied to the actuator 610 may be measured using an ATI Nano 25 force sensor 670 mounted proximate to the secondary acrylic plate 620b.

In various experiments, the actuator 610 includes a TPU-coated nylon fabric sealed into a square cross-section and having a volume of approximately 50 cm$^3$. System pressure may be measured by incorporating a "T" joint and a pressure sensor 680 proximate to where the tubing 640 exits each of the fabric actuator 610 and the capacitor 690. Tubing 640 is fitted with a two-way valve 645 between the actuator 610 and the capacitor 690.

In some embodiments, the relationship between the motion of the device and the pressure and force predicted by the model can be derived from the relationship between the displacement of the primary plate 620a and the volume of the actuator 610. Coupled position and pressure data were gathered while compressing the actuator 610 with the valve 645 closed. The empirically-measured displacement and volume data were fitted to a polynomial expression, and the end effector volume ($V_f$) computed from Boyle's law, $$V_f(x) = \frac{P_0 V_0}{P_f(x)}.$$

Figure 7:
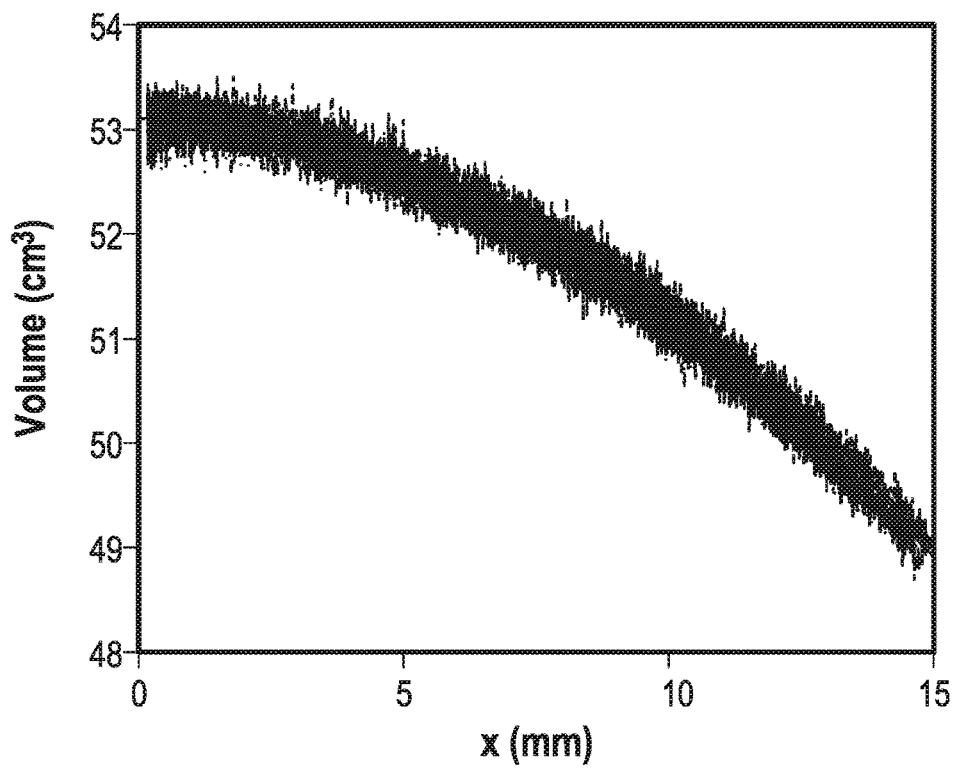
FIG. 7 is a plot of actuator volume versus the displacement of a driving element according to some embodiments.

The computed change in volume with displacement along with a quadratic fit of the measured data are shown in FIG. 7. With the data obtained from several trials with different initial pressures, the results validate the assumption that the volume of the end effector 610 depends on the position of the parallel plates and not on the internal pressure.

Figure 8A:
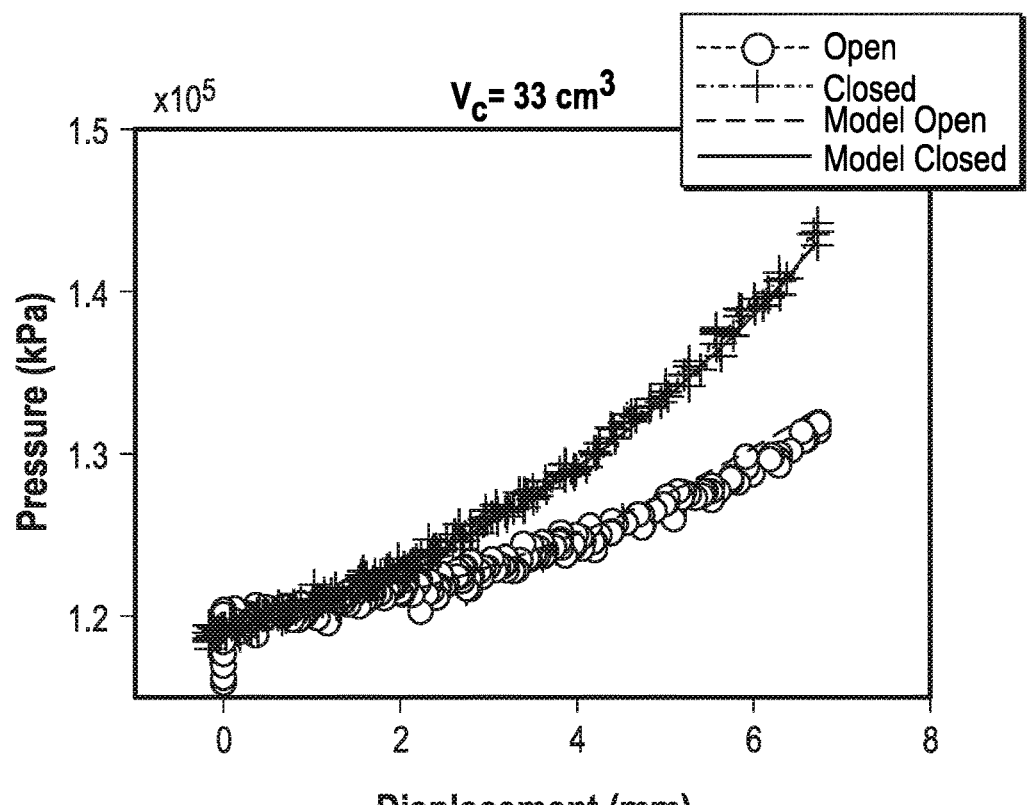
FIG. 8A is plot of actuator pressure versus displacement of a driving element for a small volume capacitor according to certain embodiments.
Figure 8B:
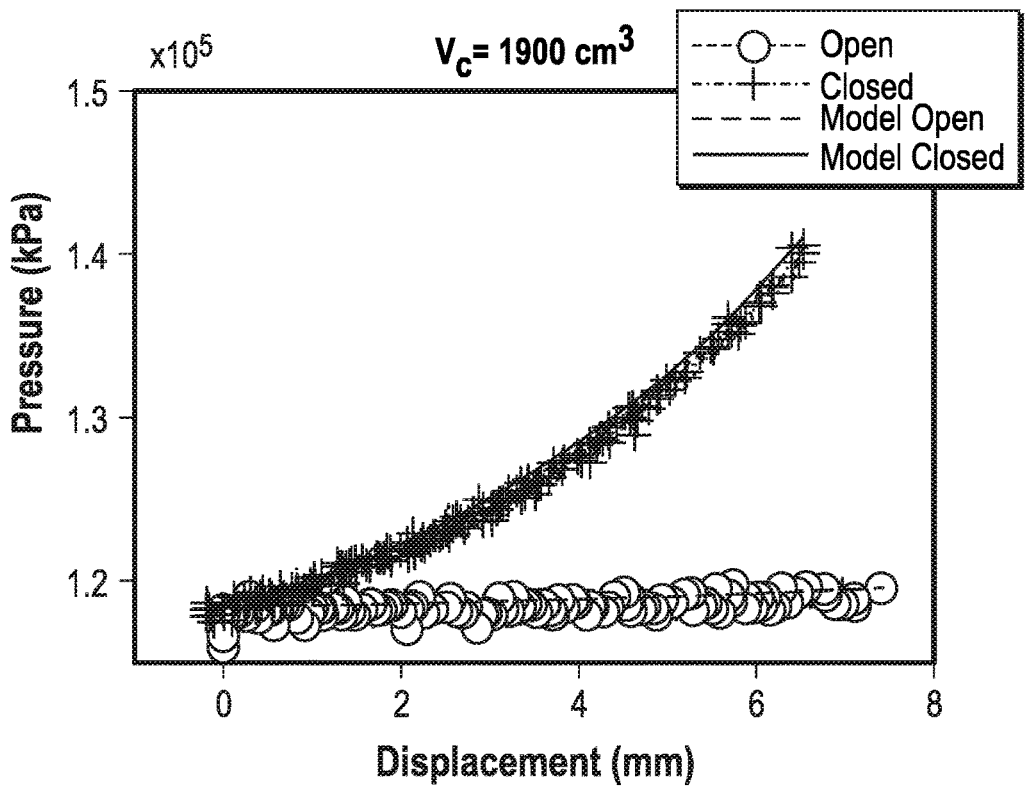
FIG. 8B is plot of actuator pressure versus the displacement of a driving element for a large volume capacitor according to certain embodiments.
Figure 8C:
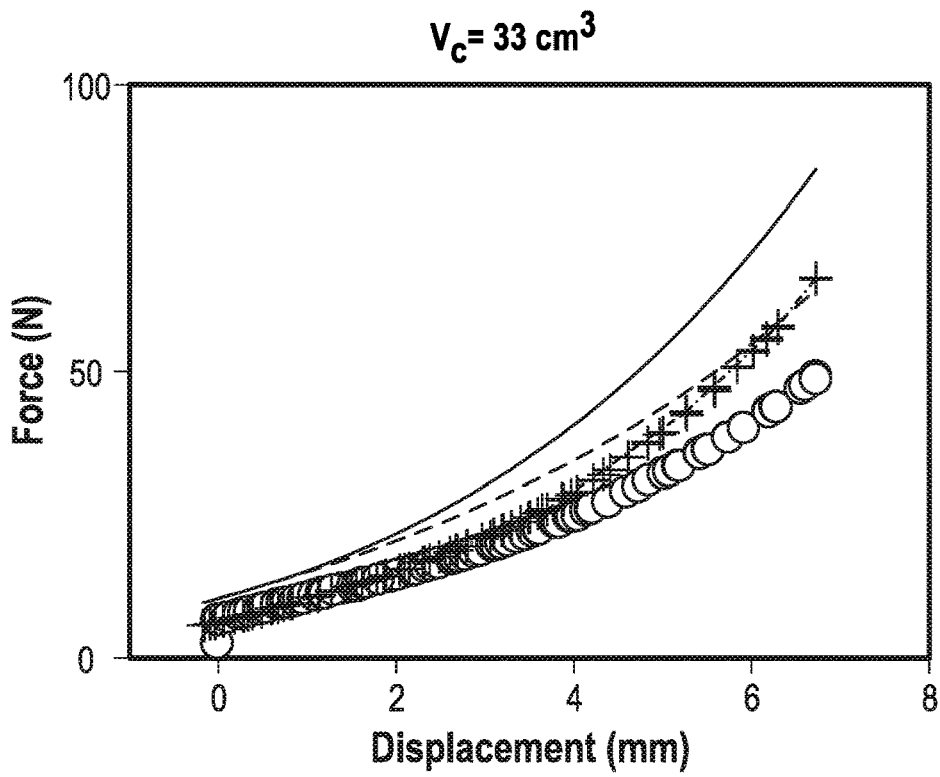
FIG. 8C is plot of actuator force versus the displacement of a driving element for a small volume capacitor according to certain embodiments.
Figure 8D:
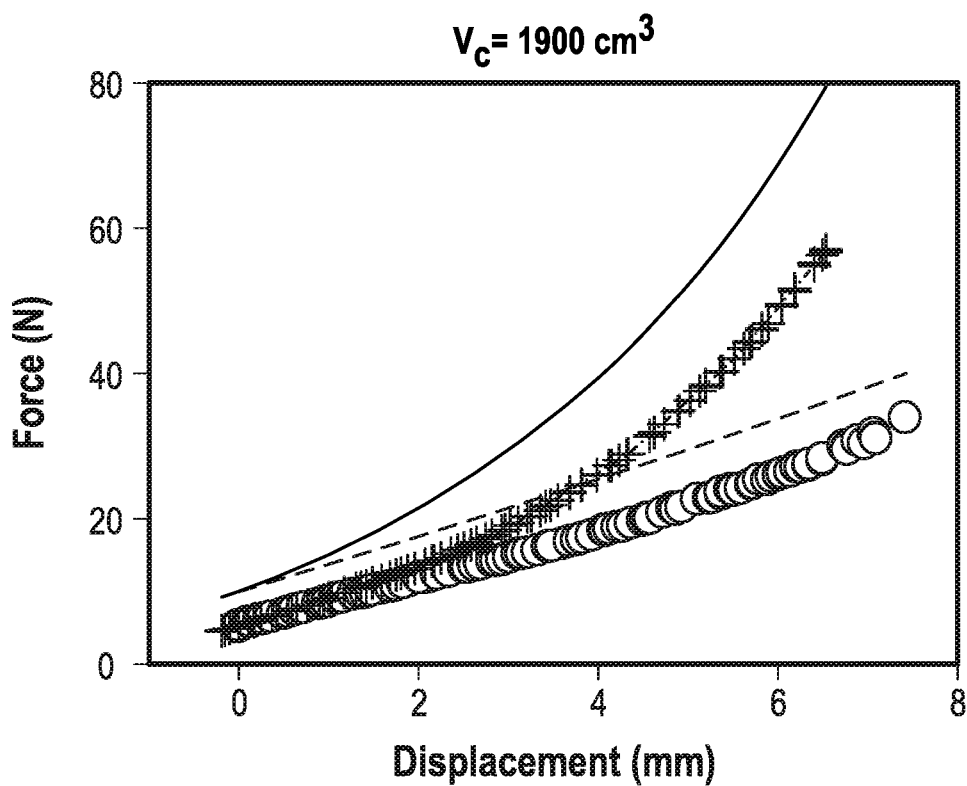
FIG. 8D is plot of actuator force versus the displacement of a driving element for a large volume capacitor according to certain embodiments.

The effect of opening and closing the valve 645 on the stiffness of the actuator 610 can be seen with reference to FIGS. 8A-8D. A plot of pressure versus displacement for small and large capacitors 690 is shown in FIG. 8A and FIG. 8B, respectively, while a plot of force versus displacement for the small and large capacitors 690 is shown respectively in FIGS. 8C and 8D. In the illustrated plots, the small capacitor volume is approximately 33 cm$^3$ and the large capacitor volume is approximately 1900 cm$^3$. Good agreement is observed between the empirical data and the theoretical model. With reference to the large capacitor data, it is noted that although the pressure does not change appreciably, an increase in the contact force is observed due to the increasing contact area or increasing value of the dV/dx term in the equation for force, $$F = -\left(\frac{P_0 V_0}{V} - P_{atm}\right)\frac{dV}{dx}.$$

According to some embodiments, a determination of the dynamic impedance may be made by compressing the actuator 610 in a cyclic fashion. In an example method, the actuator 610 is compressed by moving the primary plate 620a in a sinusoidal pattern at constant frequency, and the maximum pressure is recorded over each of three separate cycles. In some embodiments, the dynamic effects may be made more apparent by introducing an orifice into the pneumatic circuit between the valve 645 and the capacitor 690. A Bode plot showing the frequency response of the system is shown in FIG. 9.

Figure 9:
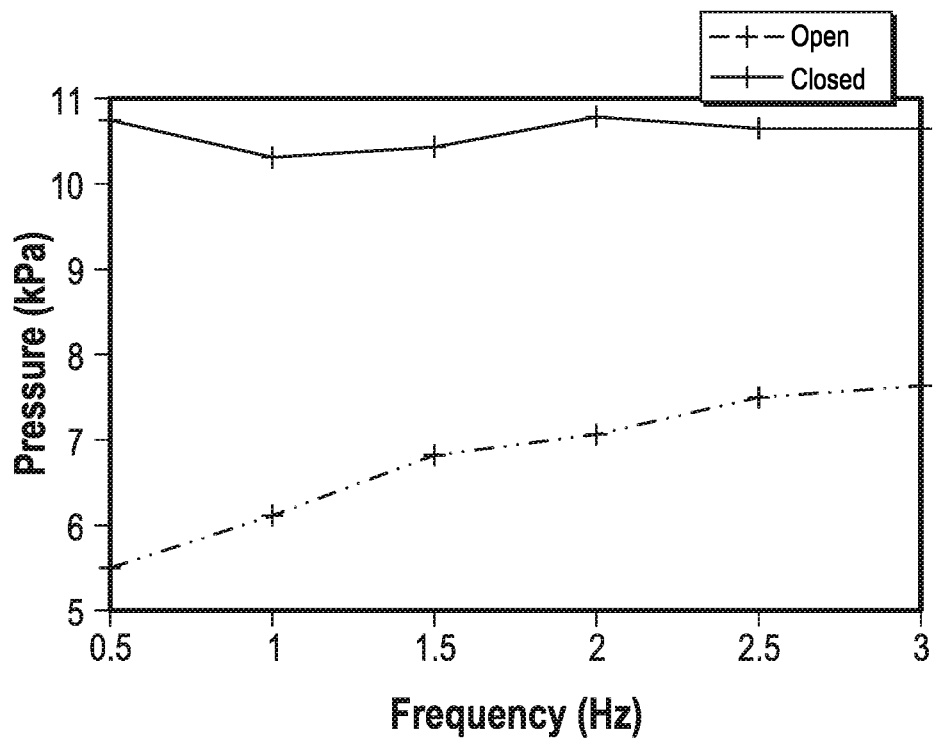
FIG. 9 is a plot of end effector peak pressure versus frequency according to some embodiments.

With reference to FIG. 9, it is noteworthy that although the maximum pressure in the end effector 610 is approximately constant with frequency when the valve 645 is closed, the maximum pressure increases slightly with frequency when the valve 645 is open, which corresponds to the fluidic resistance making a larger contribution to the force perceived by the user with high speed motion.

According to some embodiments, the bandwidth of the haptic device may be related to the passive refill time of the actuator. The bandwidth may be evaluated by initially flattening the fabric actuator 610 to approximately zero initial volume, and then pressurizing the capacitor 690 to predefined pressure with valve 645 closed. The binary valve 645 between the actuator 610 and the capacitor 690 is then opened and the pressure within the actuator 610 and the capacitor 690 is recorded.

FIG. 10 shows the time history of the measured pressure within the end effector 610 and the capacitor 690 together with predicted values from the model for several different initial pressures. With reference to FIG. 10, it will be observed that the pressure in the capacitor (691, 692, 693) initially decreases while the pressure in the end effector (611, 612, 613) remains at approximately zero until the fabric pouch fills with air. Thereafter, the pressure in the actuator increases until an equilibrium value is reached. Agreement between the model and the measured data may be obtained by fitting the parameter R\, which accounts for, inter alia, the resistance contribution of the valve 645 and the tubing 640 between the actuator 610 and the capacitor 690.

In accordance with various embodiments, one or more aspects of the presently-disclosed model may be used to inform the design and manufacture of various haptic devices. In one example, assuming the design of the valve and the user coupling, including the actuator, are predefined, the model may be used to define the size of the capacitor and the initial pressure of the circuit. Setting performance metrics as the force felt during free space motion (motion when the valve is open) and response time, which may be targeted as the time for an empty end effector to attain at least 60% of its equilibrium pressure, it will be appreciated that a fast response time may be achieved by increasing the initial pressure within the circuit and/or decreasing the volume of the capacitor. However, either of these conditions may undesirably increase the maximum force felt during free space motion.

The model, therefore, may be used to analytically predict the response time and free space force for various capacitor sizes while sampling over several different initial pressures. The simulation results using three different capacitor volumes are plotted as a Pareto front, which is shown in FIG. 11. With reference to FIG. 11, increasing the initial circuit pressure decreases the response time but increases the free space force along one of the plotted contours. In particular, the performance of larger volume capacitors dominates the performance of smaller volume capacitors. Thus, given tolerable values of free space force and response time, for example, a designer with access to FIG. 11 could determine the smallest capacitor volume that would satisfy both requirements.

FIG. 12 shows a flow diagram illustrating an example method 1200 of operating a haptic device, in accordance with some embodiments of the disclosure. The steps shown in FIG. 12 may be performed by any suitable computer-executable code and/or system, including one or more of the systems described herein. In accordance with various embodiments described herein, at step 1210, motion of an actuatable element of a haptic device may be coupled to motion of a user, the haptic device including a chamber and a fluid disposed within the chamber, the actuatable element being in hydraulic or pneumatic contact with the fluid (see, e.g., FIGS. 1-4B). At step 1220 in FIG. 12, a pressure may be applied to the fluid by displacing the actuatable element using movement of the user.

According to at least one embodiment, the method may further include actuating a valve to restrict fluid flow within the chamber. In some examples, the chamber may include a primary fluidic capacitor and a secondary fluidic capacitor in fluid communication with the primary fluidic capacitor. In this example, actuating the valve may restrict flow of the fluid between the primary fluidic capacitor and the secondary fluidic capacitor. In at least one example, a volume of the secondary fluidic capacitor may be greater than a volume of the primary fluidic capacitor.

Described herein are fluidic haptic devices, their methods of formation, structure, and mechanisms of operation. In certain embodiments, the fluidic haptic devices operate using the motion of a user to drive fluid kinetics, i.e., without an external pressure source. The haptic devices can be designed to exert large forces and can change dramatically in dimension from their unactuated state to their actuated state, which may facilitate a low encumbrance when not actuated. A haptic device in some embodiments may include a user interface, which may be composed of soft, pliable materials such as various fabrics.

By tuning the passive characteristics of the hydraulic or pneumatic circuit, different sensations can be rendered to the user. In various embodiments, the tuning may be affected by making the binary decision to open or close a valve. Example haptic devices may be characterized in terms of a dynamic range (i.e., the change in impedance felt by the user when the valve opens or closes), and a bandwidth (i.e., the fluid flow rate between a primary fluidic capacitor and a secondary fluidic capacitor).

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device, comprising:
    a chamber comprising a fluidic circuit;
    a fluid disposed within the chamber;
    an actuatable element hydraulically or pneumatically coupled to the fluidic circuit,
    wherein:
        the actuatable element is configured to induce flow of the fluid within the fluidic circuit in response to a force generated by a movement of a user of the device, the actuatable element providing a resistance to the force; and
        a pressure within the fluid arises from the force generated by the movement of the user of the device;
    a valve configured to control a flow of the fluid within the fluidic circuit; and
    a control module configured to modify the resistance to the force by controlling the valve,
    wherein the device includes a haptic device.

2. The device of claim 1, further comprising a 2-way valve adapted to restrict fluid flow within the chamber.

3. The device of claim 1, wherein the chamber comprises a closed circuit.

4. The device of claim 1, wherein the chamber comprises a primary fluidic capacitor and a secondary fluidic capacitor in fluid communication with the primary fluidic capacitor.

5. The device of claim 4, wherein the primary fluidic capacitor comprises a flexible material and the secondary fluidic capacitor comprises a rigid material.

6. The device of claim 5, wherein the primary fluidic capacitor comprises a polymer-coated fabric.

7. The device of claim 4, wherein a volume of the secondary fluidic capacitor is greater than a volume of the primary fluidic capacitor.

8. The device of claim 4, wherein the valve is in fluid communication with both the primary fluidic capacitor and the secondary fluidic capacitor.

9. The device of claim 1, wherein the fluid comprises air.

10. The device of claim 1, wherein the actuatable element comprises a roller, a diaphragm, a membrane, or a piston.

11. A virtual reality or augmented reality system comprising the device of claim 1.

12. The device of claim 1, wherein:
    the valve is a 2-way valve adapted to restrict fluid flow within the chamber; and
    the actuatable element, when displaced by the movement of the user of the device, applies the force to the fluid.

13. The device of claim 12, wherein the chamber comprises a primary fluidic capacitor and a secondary fluidic capacitor in fluid communication with the primary fluidic capacitor.

14. The device of claim 13, wherein the 2-way valve is disposed between the primary fluidic capacitor and the secondary fluidic capacitor.

15. A virtual reality or augmented reality system comprising the device of claim 12.

16. A method comprising:
    coupling motion of an actuatable element of a haptic device to a motion of a user, the haptic device comprising a chamber and a fluid disposed within the chamber, the actuatable element comprising a roller or a piston being in hydraulic or pneumatic contact with the fluid; and
    applying a pressure to the fluid by displacing the actuatable element using a movement of the user,
    wherein:
        the actuatable element is configured to induce flow of the fluid within a fluidic circuit in response to a force generated by the movement of the user, the actuatable element providing a resistance to the force;
        the pressure applied to the fluid arises from the force generated by the movement of the user; and
        the haptic device comprises a valve configured to control a flow of the fluid within the fluidic circuit and a control module configured to modify the resistance to the force by controlling the valve.

17. The method of claim 16, further comprising actuating the valve to restrict fluid flow within the chamber.

18. The method of claim 17, wherein:
    the chamber comprises a primary fluidic capacitor and a secondary fluidic capacitor in fluid communication with the primary fluidic capacitor; and
    actuating the valve restricts flow of the fluid between the primary fluidic capacitor and the secondary fluidic capacitor.

19. The method of claim 18, wherein a volume of the secondary fluidic capacitor is greater than a volume of the primary fluidic capacitor.

20. The method of claim 16, wherein the fluid comprises air.

* * * * *